June 23, 1953 T. M. MANLEY ET AL 2,643,369

MODULATED PULSE REMOTE CONTROL

Filed Sept. 28, 1945 5 Sheets-Sheet 1

INVENTOR
THEODORE M. MANLEY
ROBERT P. CHERPESKI

By, William D. Hall
ATTORNEY

INVENTOR
THEODORE M. MANLEY
ROBERT P. CHERPESKI
By: William D. Hall
ATTORNEY

June 23, 1953 T. M. MANLEY ET AL 2,643,369

MODULATED PULSE REMOTE CONTROL

Filed Sept. 28, 1945 5 Sheets-Sheet 3

INVENTOR
THEODORE M. MANLEY
ROBERT P. CHERPESKI
By: William D. Hall.
ATTORNEY

INVENTOR
THEODORE M. MANLEY
ROBERT P. CHERPESKI
By: William D. Hall.
ATTORNEY.

June 23, 1953 T. M. MANLEY ET AL 2,643,369

MODULATED PULSE REMOTE CONTROL

Filed Sept. 28, 1945 5 Sheets-Sheet 5

INVENTOR
THEODORE M. MANLEY
ROBERT P. CHERPESKI
By: William D. Hall
ATTORNEY

Patented June 23, 1953 2,643,369

UNITED STATES PATENT OFFICE 2,643,369

MODULATED PULSE REMOTE CONTROL

Theodore M. Manley, Xenia, and Robert P. Cherpeski, Dayton, Ohio

Application September 28, 1945, Serial No. 619,276

8 Claims. (Cl. 340—171)

(Granted under Title 35, U. S. Code (1952), sec. 266)

The invention described herein may be manufactured and used by or for the Government for governmental purposes, without the payment to us of any royalty thereon.

This invention relates to a system of remote control by radio signals and more particularly to means and method in a remote control radio system for initiating mechanical work.

In the past remote control radio systems have commonly been adapted for continuously maintaining a radio carrier upon which control signals have been impressed or applied when and as required.

It is among the objects of the present invention to provide an improved remote control radio system that does not require the continuous maintenance of a radio carrier; that uses a control signal of very short time duration in the order of one-thousandth of one second which, in the absence of a continuous carrier, is difficult of detection; and that uses a control signal which is adapted for transmission at sufficiently intense high power because of its brief duration so that it is detectable through radio interference of less power and with a minimum of overall energy output at the transmitter.

The above objects are augmented by additional objects that will be apparent to those who are informed in the field of remote control radio systems from the following description of an illustrative embodiment of the present invention that is presented in the accompanying drawings; wherein.

The remote control radio system that is contemplated hereby preferably uses a high frequency alternating-current carrier of, for example, 100 megacycles or over to which is applied modulation frequencies of the order, for example, of 1 megacycle or more. These modulation frequencies may be altered at will. The carrier is only transmitted when sending a control signal and then for a short time duration of one one-thousandth of one second or the like. The high frequency of the control signal modulation upon its carrier assists in its isolation in a filter at the receiver even though the time duration of the signal is very brief. The band width of the filter that is required to carry the signal modulation is not excessive due to the high frequency of the carrier upon which the signal modulation is impressed.

The receiver preferably is pretuned to the carrier and hence the tuning of the receiver to the carrier frequency is avoided. The time duration of the control signal is so short that it is not readily observed and the responsive control is actuated so quickly that it cannot readily be prevented. The application of known pulse technique at the transmitting equipment permits the use of sufficiently high power in the signal so that its power materially exceeds any interfering continuous wave form of transmission that could be maintained.

Figure 1:
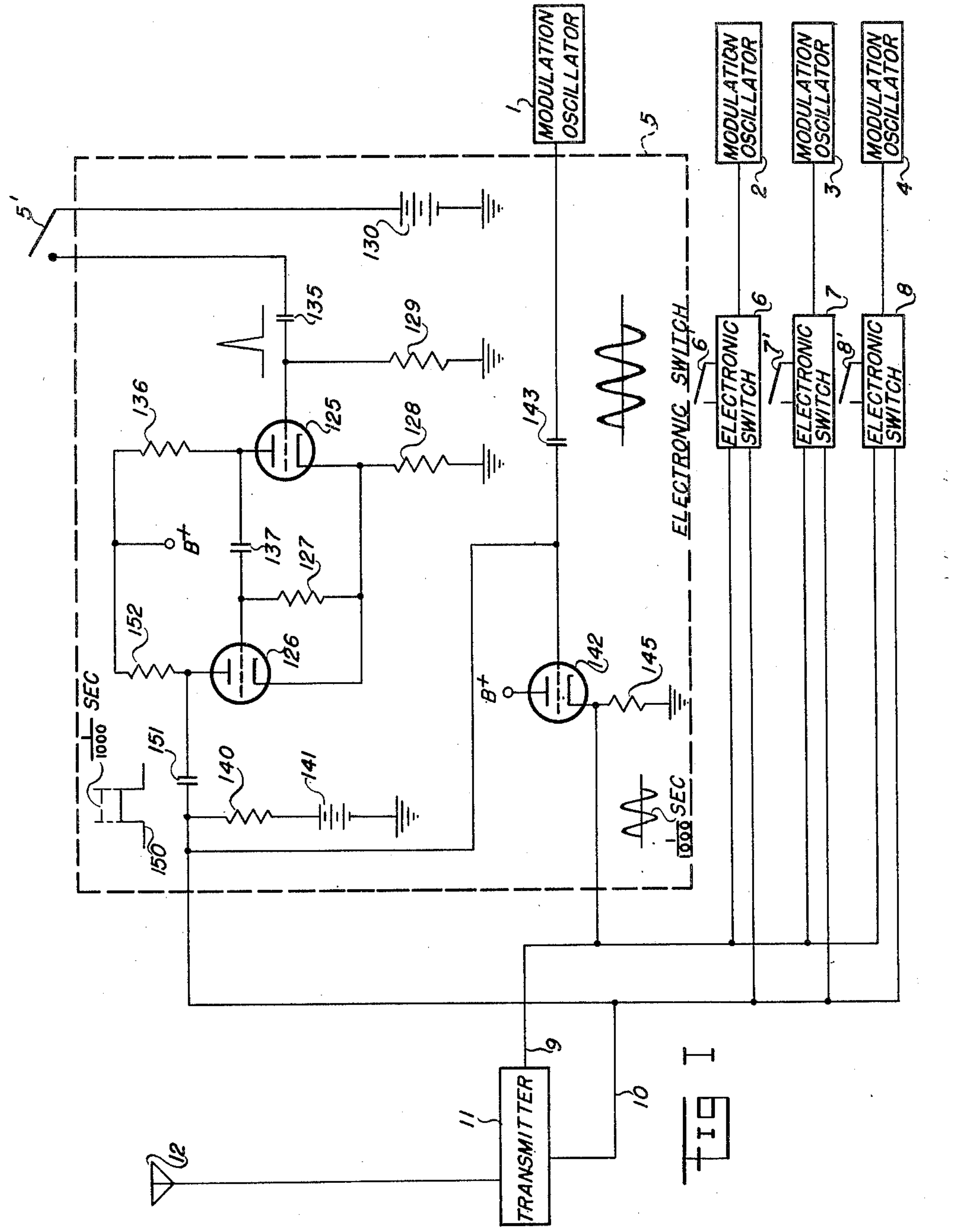
Fig. 1 is a block and schematic diagram of a preferred transmitting system that embodies the present invention.

A preferred transmitting assembly that embodies a part of the present invention is illustrated in block and schematic diagram in Fig. 1 of the accompanying drawings. In the transmitting assembly a desired plurality of modulation oscillators 1, 2, 3, 4, etc. separately apply their alternating current outputs through a corresponding number of electronic switches 5, 6, 7, 8, etc., and circuit conductors 9 and 10 to a transmitter 11. Signal from the transmitter 11 is radiated from a transmitting antenna 12.

The modulation oscillators 1, 2, 3, 4, etc. have individually different rates of oscillation. The functioning of the electronic switches 5, 6, 7, 8, etc. is controlled by the manual operation of corresponding switches 5', 6', 7', 8', etc. respectively. For each closure of one of the switches 5', 6', 7', 8', etc. the transmitter 11 emits a single alternating current pulse of radio carrier of a definite predetermined short time duration, such as one one-thousandth of one second preferably, irrespective of the time during which the switch 5', 6', 7', 8', etc. remains closed. The electronic switch as 5, 6, 7, 8, etc. are duplications of each other and hence a detailed description of the electronic switch 5 may be taken as being illustrative of the other electronic switches is held closed in the transmitting circuit of the system.

The schematic diagram of the electronic switching of the modulating and transmitting system that is shown in Fig. 1 as exemplified by that in the electronic switch 5, comprises electron tubes 125 and 126 that are connected to provide a usual one-shot multivibrator circuit. The tube 126 is normally conducting since its grid is returned to cathode through a resistor 127. Resistor 152 is the plate load resistance of tube 126. The tube 125 is cut off by the potential developed across the common cathode resistor 128 due to the conduction of the tube 126. The grid of tube 125 is returned to ground through a resistor 129. Closing of the switch 5′ causes the full positive potential of battery 130 to be applied instantaneously to the grid of the tube 125 across resistor 129. The potential decreases rapidly to zero as a capacitor 135 is charged to the voltage of battery 130. The effect is to impress a very short positive pulse upon the grid of the tube 125 which causes tube 125 to start to conduct current. The resultant current flow through the resistor 136 produces a change in potential across capacitor 137 which causes a negative potential to be impressed on the grid of the tube 126 across resistor 127, causing the tube 126 to stop conducting. The negative voltage on the grid of the tube 126 decreases as the capacitor 137 is discharged through the resistors 127, 128 and 136. When the negative potential across the resistor 127 reaches a value that is less than the cut-off bias of the tube 126, the tube 126 again begins to conduct and cuts off the conduction of the tube 125.

The time that tube 125 conducts after the closure of the switch 5′ may be adjusted by varying the time constant of the combination capacitor 137, and the resistors 127, 128 and 136. Preferably, the time constant is very short so that the time during which the tube 125 conducts is in the order of one one-thousandths of one second or one millisecond. A positive pulse of one millisecond duration is developed across resistor 140 each time the switch 5′ is closed. The positive pulse can be used to key the output of any one of the modulation oscillators 1, 2, 3, or 4, of which the modulation oscillator 1 is taken as being representative, and to energize the transmitter 11 through the circuit conductor 10. The direct current pulse voltage represented by the square wave 150 is coupled by a capacitor 151 to the grid of the tube 142 and along conductor 10 to the transmitter 11 as a keying pulse therefor. A battery 141 is connected in series with the resistor 140 which serves as grid return for a tube 142, so that the tube 142 normally is biased beyond cutoff. With the application of a one millisecond positive pulse from the modulation oscillator 1 to the electronic switch 5, the grid of the tube 142 is raised to a less negative value so that the oscillations from the modulation oscillator 1 are impressed upon capacitor 143 and are reproduced in the cathode circuit of the tube 142 across a resistor 145. The output from the tube 126 is applied to the transmitter 11 through the conductor 10. The approximate shapes of the pulses at the various stages in the circuit that is shown in Fig. 1, are shown below the capacitor 143, beside the resistor 145, above the capacitor 135 and above the resistor 140.

Operatively, the transmitter 11 is adapted to supply a radio carrier of, for example, the order of 100 megacycles, or the like. A single alternating-current pulse of the radio carrier is emitted by the transmitter 11 over the transmitting antenna 12 with each depression of one of the switches 5′ to 8′ inclusive. Each radio carrier alternating-current pulse is, for example, of a time duration in the order of 100 microseconds. As referred to herein, an "alternating-current pulse" will be understood to mean a brief train of oscillations having a substantially rectangular wave envelope. Modulation of the radio carrier from the transmitter 11 is accomplished by any, separately, or by any combination, concurrently, of the modulation oscillators 1 to 4, inclusive, depending upon the closure of one or more of the corresponding modulation oscillator switches 5′ to 8′, inclusive, respectively.

The various frequencies of oscillation of the modulation oscillators 1 to 4, inclusive, for purposes of convenient reference thereto, may be designated as the fixed frequency bands $F_1$, $F_2$, $F_3$ and $F_4$, respectively. For example, if the switch 5′ of the electronic switch 5 is closed and the other modulation oscillator switches 6′, 7′ and 8′ are open, then one alternating-current pulse of the radio carrier modulated to be within the frequency band $F_1$ at which the modulation oscillator 1 is oscillating, is radiated from the antenna 12. In a similar manner, if the switches 5′ and 7′ are closed, then the alternating-current carrier that is emitted during the brief interval of time that the transmitter 11 is energized by electronic switches 5 and 7, is modulated simultaneously by oscillations within the frequency bands $F_1$ and $F_3$.

Each of the frequency bands $F_1$, $F_2$, $F_3$ and $F_4$ are, for example, of the order of 1 megacycle, or the like.

Figure 2:
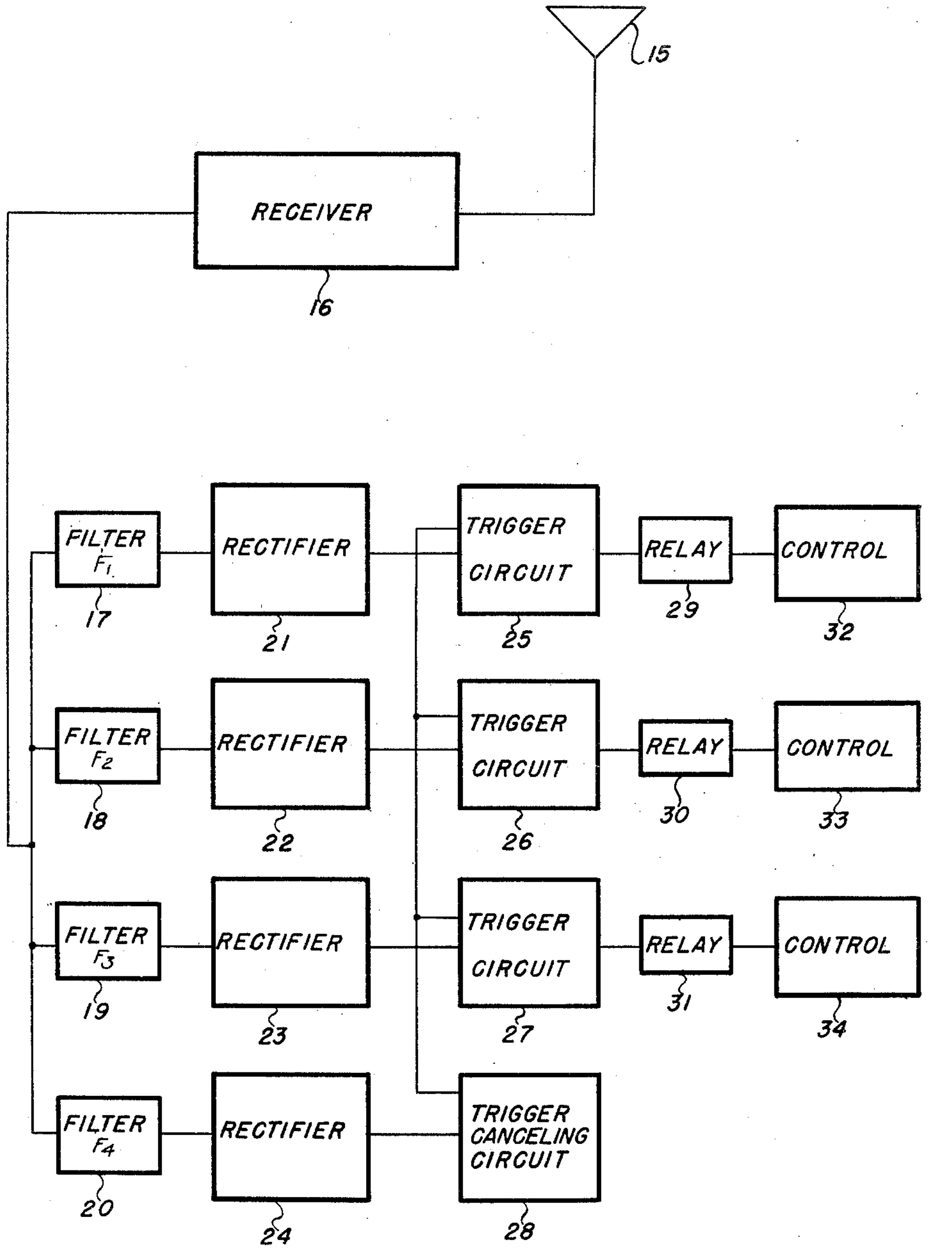
Fig. 2 is a block diagram of a preferred receiving system that embodies the present invention.

A preferred receiver circuit that is a part of the present invention is shown in block diagram in Fig. 2 of the accompanying drawings. In the receiver circuit shown, the alternating-current signal that is transmitted from the transmitter 10 over its transmitting antenna 11 is intercepted by a receiver antenna 15 and is passed to and detected by a radio receiver 16. Amplified alternating-current output from the radio receiver 16 is applied to a desired plurality of filters 17, 18, 19, 20, etc., that, for the purposes of the present explanation, may be assumed to correspond to the number of and to separately pass the modulation frequency bands $F_1$, $F_2$, $F_3$, $F_4$ etc. that are applied to the radio carrier by the modulation oscillators 1 to 4, inclusive, respectively throughout. The modulating signals of the frequency bands $F_1$, $F_2$, $F_3$, $F_4$, etc. are recovered by detection in the radio receiver 16.

The alternating-current radio signals that are received and detected in the radio receiver 16 are amplified in usual manner in the broad band pass channel of the receiver 16 and the amplified alternating-current signals are then applied to the bank of filters 17 to 20, inclusive. Each filter 17 to 20, inclusive, is selectively responsive to one of the detected modulated and amplified signal frequency bands $F_1$, $F_2$, $F_3$ and $F_4$, etc., respectively, and are passed through a corresponding number of rectifiers 21, 22, 23, 24 etc. as direct-current pulses to a corresponding number of electronic trigger circuits 25, 26, 27, etc., and a trigger cancelling circuit 28, respectively, throughout. A direct-current pulse, within the meaning of the present specification, is a discrete, unidirectional pulse as contrasted with a pulse made up of a train or "packet" of individual oscillations.

The direct-current pulses entering the trigger circuits 25 to 27, inclusive, or the trigger cancelling circuit 28, appear as direct-current pulses of, in the example cited, 100-microsecond time duration. Each of the trigger circuits 25 to 27, inclusive, provides positive direct-current pulses of continuing duration and the trigger cancelling circuit 28 provides an elongated, self-terminating positive direct-current pulse. The direct-current pulses of continuing duration, as separate outputs of the trigger circuits 25, 26, and 27, are applied to relays 29, 30 and 31, respectively, wherein the pulses energize individual relay windings to initiate the actuation of desired usual mechanisms in controls 32, 33 and 34, respectively, for the performance of desired mechanical work thereby.

The positive direct-current self-terminating pulse output from the trigger cancelling circuit 28 is applied to the other trigger circuits 25, 26 and 27 for arresting the operation thereof. The direct-current pulse from the trigger cancelling circuit 28 is derived from an alternating-current modulating signal of the frequency $F_4$ and the alternating-current pulse is lengthened out into a self-terminating positive direct-current pulse of longer time duration than the other alternating-current within the frequency bands $F_1$ to $F_3$, inclusive.

The elongated signal terminating or cancelling positive direct-current pulse from the trigger cancelling circuit 28 serves both to deenergize the relay windings by terminating the direct-current pulses in the trigger circuits 25 to 27, inclusive, and to reset the trigger circuits 25 to 27, inclusive, for their next actuation upon the receipt of the next direct-current pulse that may be applied thereto. Upon the deenergization of the relay windings in the relays 29 to 31, inclusive, operable elements of the corresponding controls 32 to 34, inclusive, respectively, are released automatically in any desired usual manner.

The absence of a continuous radio carrier and the brevity of the period of transmission of the control signals in the frequency bands $F_1$ to $F_4$, inclusive, are advantageous in that they permit exceedingly high power to be concentrated into the signals at the transmitter. The high power of these signals enables the signals to penetrate substantially any interfering radio carrier or signal of lesser power and to be satisfactorily received therethrough at the receiver 16. As previously mentioned, the modulating frequency bands $F_1$ to $F_4$, inclusive, are of the order of 1 megacycle and the filters 17 to 20, inclusive, respectively, are tuned to the passing of these frequencies.

In operation, one or more alternating-current signals from the transmitter 10 are intercepted by the receiving antenna 15 and are passed to the receiver 16. The signals so received are amplified within the receiver 16 and the amplified signals are passed from the receiver to all of the filters 17 to 20, inclusive, in parallel. The filters 17 to 20, inclusive, serve as band pass filters that channel the various alternating-current signals according to their respective frequencies $F_1$ to $F_4$, inclusive, and pass their respective alternating-current signals to the rectifiers 21 to 24, inclusive, respectively, in which the signals are converted into direct-current signals. The resultant direct-current pulses are passed from the rectifiers 21 to 24, inclusive, to their respective trigger circuits 25 to 27, inclusive, and the trigger cancelling circuit 28. The direct-current pulses so applied to the trigger circuits 25 to 27, inclusive, are of continuous duration therein and cause current to flow through the corresponding relays 29 to 31, inclusive, and continuously energize the relay windings thereof. The energization of the windings of the relays 29 to 31, inclusive, is effective to close the contacts thereof and apply current flow to the corresponding controls 32 to 34, inclusive, that accomplish mechanical work. The trigger cancelling circuit 28 passes a direct-current, self-terminating positive pulse of increased time duration to all of the trigger circuits 25 to 27, inclusive, and serves to terminate the direct-current flow of continuous duration therein and to reset the trigger circuits 25 to 27, inclusive, preparatory to the reception of additional alternating-current signals by the receiver 16. Upon the resultant deenergization of the relay windings in the relays 29 to 31, inclusive, the operable elements of the controls 32 to 34, inclusive, respectively, are released.

Figure 3:
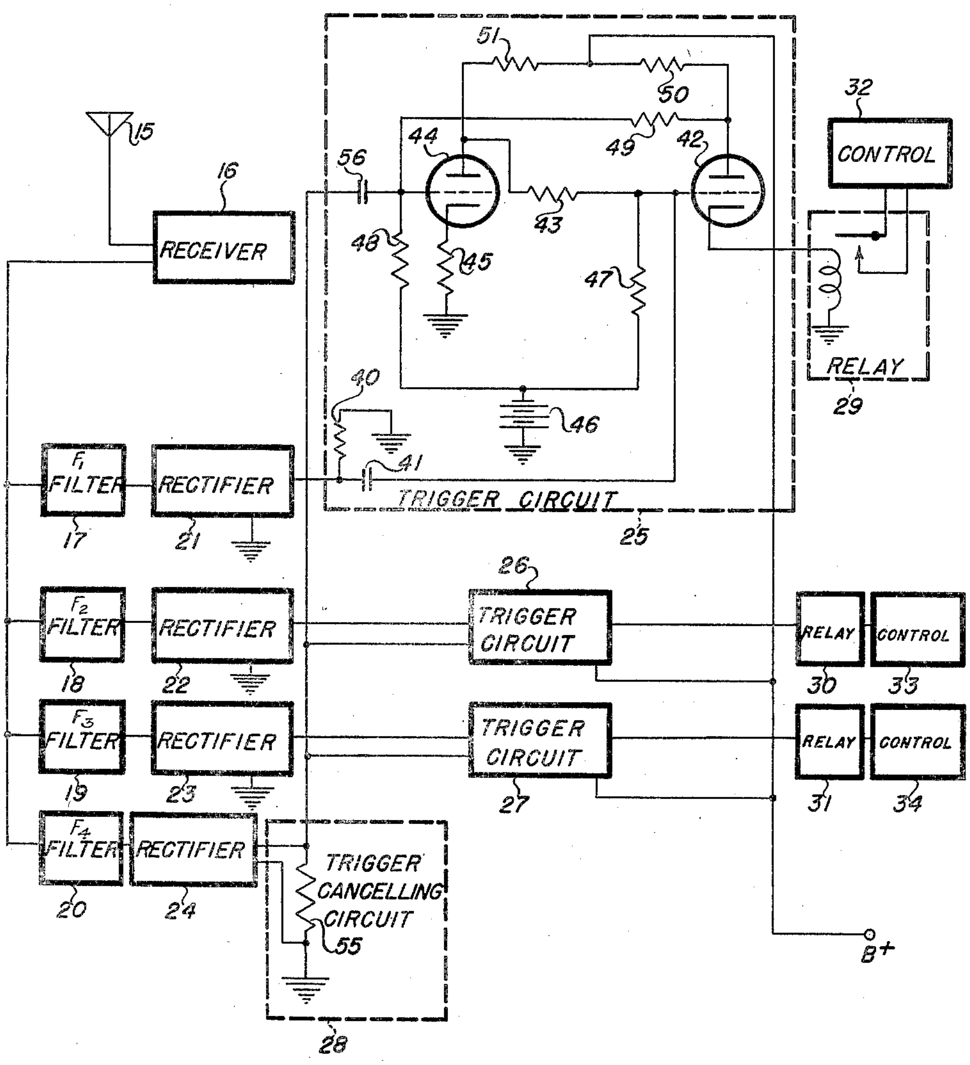
Fig. 3 is a block and schematic diagram of the receiving system that is shown in Fig. 2.

A block and schematic diagram augmenting the showing in Fig. 2 is presented in Fig. 3 of the accompanying drawings. In the circuit that is shown in Fig. 3, alternating-current signals that are radiated by the transmitter 11 from its antenna 12 are intercepted by the receiving antenna 15 and are passed to the receiver 16 where the received signals are amplified and impressed upon a desired plurality of the filters 17 to 20, inclusive, that pass individually different illustrative frequency bands $F_1$ to $F_4$, inclusive, respectively. The filters 17 to 20, inclusive, selectively pass alternating-current signals of frequency bands $F_1$ to $F_4$, inclusive, into their respective channels and to a corresponding plurality of the grounded rectifiers 21 to 24, inclusive, respectively, throughout. The direct-current pulse outputs of the rectifiers 21, 22 and 23 are passed respectively to a corresponding plurality of the electronic trigger circuits 25, 26 and 27, respectively. The trigger circuits 25, 26 and 27 are substantially duplications of each other and hence the detailed circuit description of one trigger circuit may be taken as being illustrative of the description of the other two, all of which are modifications of the usual Eccles-Jordan multivibrator or flip-flop circuit.

A positive direct-current input pulse, as applied to an illustrative trigger circuit 25, is impressed across a rectifier load resistor 40 to ground and through a blocking capacitor 41 to the grid of a triode electron tube 42. The grid of the tube 42 is cross-connected through a resistor 43 to the plate of another triode electron tube 44, the cathode of which is grounded through a resistor 45. The negative terminal of a suitable direct-current source, such as the battery 46 or the like, that has its positive terminal connected to ground, provides bias supply to the grids of the tubes 42 and 44 through isolating resistors 47 and 48, respectively. The plate of the tube 42 is connected through a resistor 49 with the grid of the tube 44. Plate current from a suitable source of positive direct current, such as the B+ source shown, is applied through isolating resistors 50 and 51 to the plates of the tubes 42 and 44, respectively. The cathode of the tube 42 is grounded through the winding of the relay 29. Upon the energization of the winding of the relay 29, its contact or switch is closed and circuit to the control 32 is completed. The trigger circuits 26 and 27 are duplications of the trigger circuit 25 in structure and in functions.

Received alternating-current signals within the frequency band $F_4$, that are passed by the filter 20 and that are rectified as positive direct-current pulses in the rectifier 24, are passed to the trigger cancelling circuit 28 in which the positive direct-current pulses are applied across a resistor 55 that is grounded at one end and that has its ungrounded end connected in parallel to the trigger circuits 25, 26 and 27. A positive direct-current pulse across the resistor 55 is applied to the grid of the tube 44 through a blocking capacitor 56, and is similarly applied through corresponding blocking capacitors, not shown, in the trigger circuits 26 and 27.

In operation, alternating-current signals originating in one or more of the modulation oscillators 1, 2, 3 or 4, depending upon which of the switches 5′, 6′, 7′ or 8′ is closed, are emitted from the transmitter 11 through its transmitting antenna 12 and are intercepted by the receiving antenna 15 and passed to the receiver 16 in the receiving system. The alternating-current output from the receiver 16 is applied to the filters 17, 18, 19 and 20 that channel the alternating-current signals in conformity with the frequencies of the received signals. The filters 17, 18, 19 and 20 selectively pass alternating-current signals falling within their respective frequency bands $F_1$, $F_2$, $F_3$ and $F_4$, respectively.

Upon the reception of an alternating-current signal pulse of a freqency that falls within the frequency band $F_1$ signal is passed by the filter 17 and is converted from alternating to direct current in the rectifier 21. The positive direct-current pulses which are derived from the alternating-current pulses that are fed into the rectifier 21 are passed thereby to the electronic trigger circuit 25. The time period of each input pulse and of each positive direct-current pulse preferably is predetermined, as, for example 100 microseconds or the like.

A square wave pulse of positive direct-current electricity passed from the rectifier 21, to which the grounded load resistor 40 is applied, is effective to build up a positive potential on the blocking capacitor 41 within the electronic trigger circuit 25. The positive potential pulse on the capacitor 41 is applied to the grid of the tube 42 where it initiates a continuous current flow through the plate and cathode circuit of the tube 42 and simultaneously blocks the flow of current through the plate and cathode circuit of the tube 44. The flow of current through the grid and cathode circuit of the tube 42 passes to positive ground through and energizes the winding of the relay 29 and thereby closes the contact or switch of the relay 29 to complete the circuit through the control 32 for the doing of mechanical work.

The continuous flow of current through the plate and cathode circuit of the tube 42, that continues to draw current after the control alternating-current signal has ceased, is arrested at will by signal within the frequency band $F_4$ originating in the modulation oscillator 4, shown in Fig. 1, such signal passing through the switch 8′ in its closed position to the transmitter 11 and being transmitted therefrom over the transmitting antenna 12. The alternating-current signal within the $F_4$ band of frequencies is intercepted by the receiving antenna 15, shown in Fig. 3, amplified in the receiver 16 and is passed by the filter 20 to the rectifier 24 as an alternating-current pulse. The alternating-current pulse is rectified and lengthened in the rectifier 24 into a self-terminating pulse of positive direct-current and of longer time duration than any of the other alternating-current pulses in the frequency bands $F_1$, $F_2$ or $F_3$ that are rectified and passed to the trigger circuits 25, 26 or 27, respectively. The elongated, self-terminating, positive direct-current pulse so produced is applied across the grounded resistor 55 and is applied simultaneously in parallel to all of the trigger circuits 25, 26 and 27.

In the period during which the contact or switch of the relay 29 is being held closed, the elongated, self-terminating pulse of positive direct-current voltage from the rectifier 24 is applied through the blocking capacitor 56 to the grid of tube 44 in the trigger circuit 25. The pulse so applied initiates current flow between the plate and the cathode of the tube 44, which results in blocking the current flow between the plate and cathode of the tube 42, thus deenergizing the winding of the relay 29. The deenergization of the winding of the relay 29 permits its contact or switch arm to open under spring tension in usual manner and interrupts the circuit through the control 32 and stops the mechanical work being done thereby.

The blocking of the current flow between the plate and the cathode of the tube 42 resets the trigger circuit 25 for its actuation by the next alternating-current pulse signal within the frequency band $F_1$ that is passed by the filter 17. The reception of a cancelling alternating-current signal within the frequency band $F_4$, that passes the filter 20 in the above described manner, cancels any and all alternating-current control signals that have previously been imposed upon any or all of the trigger circuits 25, 26 and 27 in the manner described for the trigger circuit 25. Following the imposition of a cancelling signal within the frequency band $F_4$ upon the trigger cancelling circuit 28, all of the trigger circuits 25, 26 and 27 are reset for the imposition thereupon of further control signals that may be terminated subsequently by the imposition of a following cancelling signal upon the trigger cancelling circuit 28.

Figure 4:
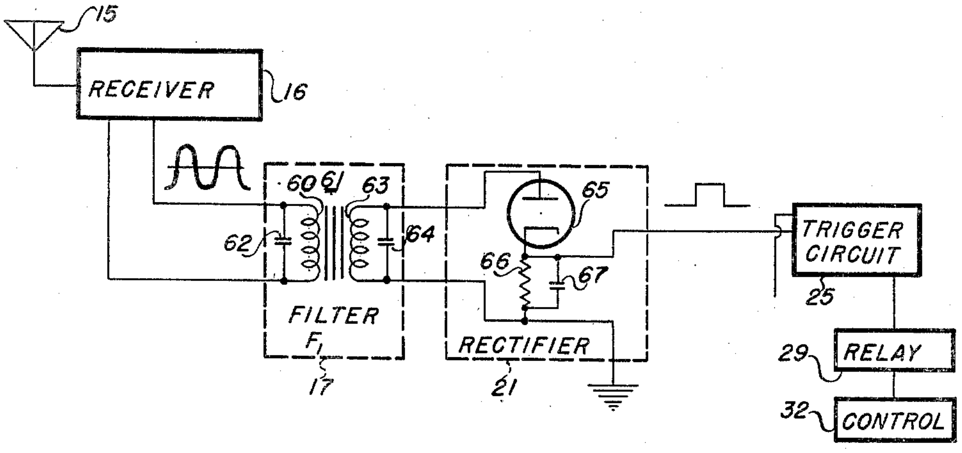
Fig. 4 is a fragmentary block and schematic diagram of a portion of the receiving system that is shown in Fig. 2.

A representative schematic showing of the filters 17 to 20, inclusive, as for example, filter 17, and of an electron tube type of the rectifiers 21 to 24, inclusive, for example, rectifier 21, is shown illustratively in Fig. 4 of the accompanying drawings. In the portion of the system circuit there shown, output from the receiver 16 in the form of an alternating-current sine wave, shown beneath the receiver 16, is applied across the primary winding 60 of a transformer 61 that is disposed within the filter 17. The primary winding 60 of the transformer 61 is tuned to the frequency band $F_1$ in any desired manner, as by a tuning capacitor 62, or the like. The secondary winding 63 of the transformer 61 in the filter 17 is similarly tuned by a tuning capacitor 64. The output from the transformer 61 is applied across the plate and ground of a diode rectifier 65, within the rectifier 21. The cathode of the tube 65 is grounded through a cathode resistor 66 shunted by a radio-frequency by-pass capacitor 67 within the rectifier 21. The positive direct-current pulse output from the cathode side of the tube 65 in the rectifier 21 is applied directly from the cathode of the tube 65 to the trigger circuit 25 as a positive square wave pulse shown therebetween.

The alternating-current pulse output from the receiver 16 is, in the described manner, rectified and applied as a direct-current pulse to the trigger circuit 25, and in parallel to the other trigger circuits 26 and 27 and to the trigger cancelling circuit 28. Other types of rectifiers, such as metallic oxide, crystal, or the like, rectifiers with suitable conventional modifications in the accompanying portions of the circuit, if preferred, may be substituted for the electron tube 65 in the rectifier 21, without departing from the scope of the present invention.

The rectifiers 21 to 24, inclusive, in the above described receiver portion of the system circuit that is shown in Fig. 3, may be omitted, if preferred, by resorting to suitable grid leak detector action in the grid circuits of the tubes 42 and 44 through the proper selection of values for the grid leak resistors 47 and 48, for the capacitor 41 and for the direct-current supply 46.

Figure 5:
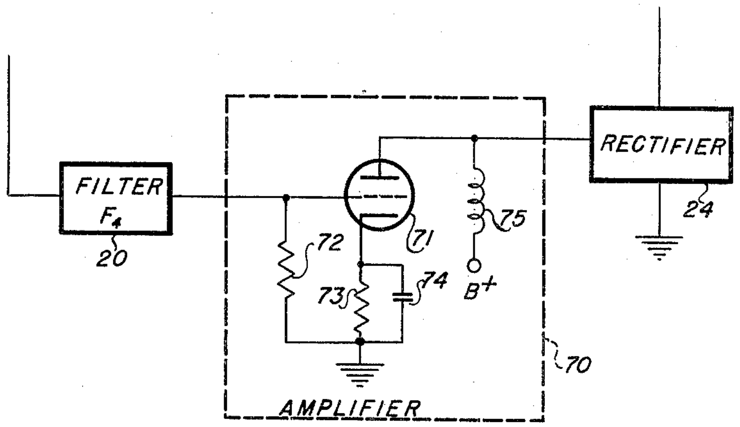
Fig. 5 is a fragmentary diagram of a modification in the trigger cancelling portion of the circuit that is shown in Fig. 2.

In the event that the number of trigger circuits 25, 26, 27, etc. is such that amplification of the direct-current pulse output from the trigger cancelling circuit 28 is desirable, an amplifier 70, that is shown in Fig. 5, for boosting the signal amplification by the receiver 16 may be inserted at a desired position in the receiver circuit, and preferably between the filter 20 and rectifier 24, as is shown in Fig. 5 of the drawing. In the receiver circuit portion there shown, the alternating-current output from the filter 20 is applied to the grid of an amplifier tube 71 that is disposed within the amplifier 70. A grid leak resistor 72 and a cathode resistor 73 that is shunted by a radio-frequency by-pass capacitor 74, are connected to ground from the grid and cathode of the tube 71, respectively, so that the grid is maintained at a substantially fixed negative ground potential with respect to the cathode of the tube 71 and so that negative feedback is reduced. A suitable positive direct-current source, such as B+ shown, or the like, supplies direct-current plate current through a choke coil 75 or the like, to the plate of the tube 71 from which an amplified alternating-current output is passed from the amplifier 70 to the rectifier 24 for rectification therein.

Figure 6:
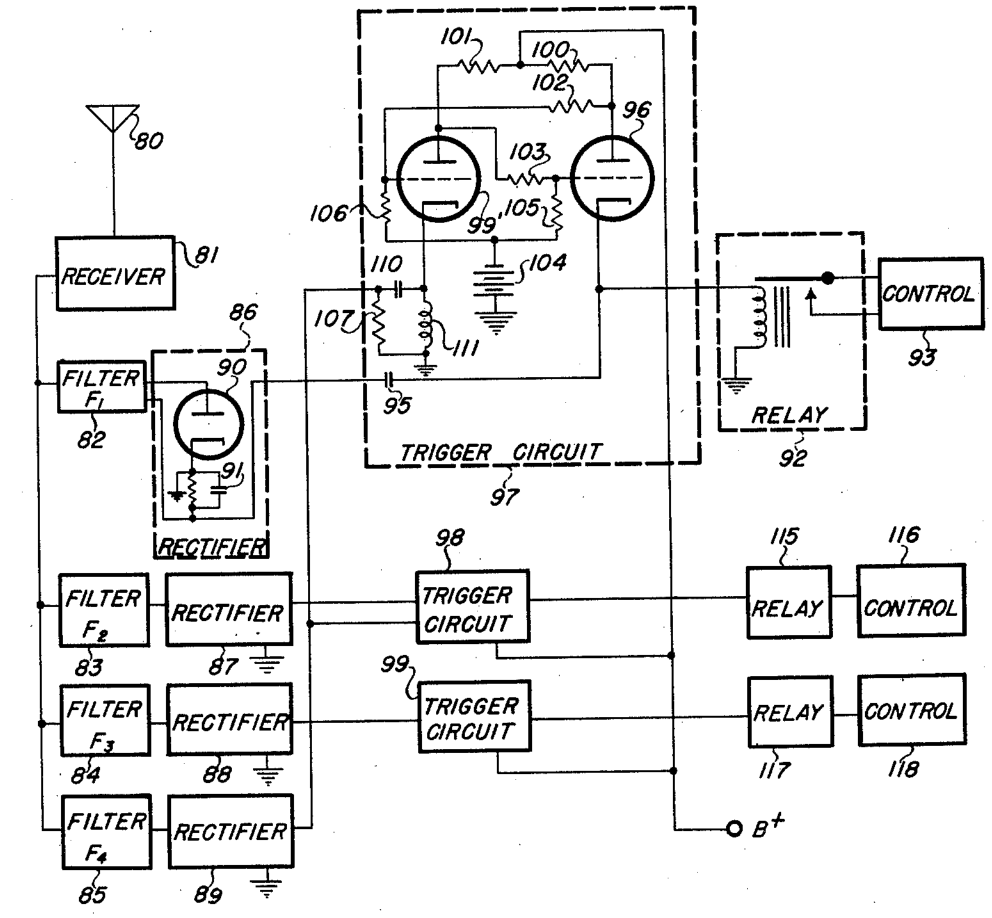
Fig. 6 is a block and schematic diagram of a modification of the receiving system that is shown in Fig. 2.

A modification of the receiving portion of the system circuit is shown in Fig. 6 of the accompanying drawings. In this modification of the receiver circuit the trigger actuating and trigger cancelling circuit signals are negative-going pulses of direct-current whereas the comparable signals in the receiver circuit that is shown in Fig. 3 are pulses of positive direct current.

In the receiver portion of the system circuit that is shown in Fig. 6 of the drawings, alternating-current signal pulses that originate in any of the modulation oscillators 1 to 4, inclusive, shown in Fig. 1, and that are transmitted by the transmitter 11, are intercepted by a receiving antenna 80 and are passed to the receiver 81 and provide signal input to the receiving portion of the system circuit. The alternating-current signals so received are of predetermined groups of frequencies that are distinguished from each other, as by being within the frequency bands $F_1$, $F_2$, $F_3$ and $F_4$ to which a desired plurality of filters 82, 83, 84 and 85, respectively, are tuned.

The alternating-current pulse output from the receiver 81 is applied in parallel to the filters 82 to 85, inclusive. The filters 82 to 85, inclusive, channel the received alternating-current pulses depending upon their frequencies and pass them to a corresponding plurality of rectifiers 86, 87, 88 and 89, respectively. Each of the filters 82 to 85, inclusive, comprises a tuned transformer, such as the transformer 61 of the filter 17 that is shown in Fig. 4. The outputs from each secondary winding of the transformers in the filters 82 to 85, inclusive, are applied to the rectifiers 86 to 89, inclusive, respectively.

The rectifiers 86 to 89, inclusive, are duplications of each other and the description of the schematic circuit diagram for the rectifier 86, that is shown in Fig. 6, may be taken as being representative of the other rectifiers 87, 88 and 89 therein. The output from the secondary winding of the transformer in the filter 82 is applied across the plate and directly grounded cathode of a rectifier tube 90 in the rectifier 86. A cathode resistor and radio-frequency by-pass combination 91 is in series between the cathode side of the secondary winding of the transformer in the filter 82 and the directly grounded cathode of the tube 90. The output from the rectifier 86 is a negative direct-current pulse and is taken directly from the cathode side of the secondary winding of the transformer within the filter 82 and is applied through a blocking capacitor 95 to the cathode of a triode electron tube 96 within a trigger circuit 97.

Outputs from the plurality of rectifiers 86, 87 and 88 are applied to a corresponding plurality of trigger circuits 97, 98 and 99. The output from the rectifier 89 is an elongated, negative, self-terminating direct-current pulse and is applied in parallel to the trigger circuits 97, 98 and 99 for cancelling the current flow therein and resetting the trigger circuits 97, 98 and 99 for the reception of other signals. The circuits of the trigger circuits 97, 98 and 99 are duplications of each other and the description of the circuit of the trigger circuit 97 may be taken as being illustrative of the circuits of the other trigger circuits 98 and 99.

The application of the negative pulse from the rectifier 86 through the blocking capacitor 95 to the cathode of the electron tube 96 momentarily throws cathode of the tube 96 more negative than ground potential and sufficiently negative with respect to the grid of the tube 96 so that the tube 96 conducts to ground through the winding of a relay 92. The energization of the winding of the relay 92 closes the contact or switch of the relay 92 and closes the circuit of a control 93 thereby causing mechanical work to be performed. This flow of current through the winding of the relay 92 continues as long as current from the plate of the tube 96 continues to flow to the cathode of the tube 96 and through the winding of the relay 92 to ground. Positive direct-current is supplied to the plate of the tube 96 and to the plate of another tube 99′ within the trigger circuit 97 through isolating resistors 100 and 101 respectively, from a suitable source, such as from the B+ current source shown, or the like.

The plate of the tube 96 is connected through a resistor 102 with the grid of the tube 99′. The plate of the tube 99′ is connected through a resistor 103 with the grid of the tube 96. A negative direct-current potential from a suitable source, such as a battery 104, that has its positive terminal connected to ground, or the like, is applied through resistors 105 and 106 to the grids of the tubes 96 and 99′, respectively.

The contact or switch of the relay 92 continues to be closed until an alternating-current signal of a frequency within the frequency band $F_4$ and originating within the modulation oscillator 4, is broadcast from the transmitting antenna 12 upon the depression of the sending key 8′ and is intercepted by the receiving antenna 80 and applied by the receiver 81 to the filter 85. The alternating-current signal within the frequency band $F_4$ is passed by the filter 85 and is converted by the rectifier 89 into an elongated, self-terminating, negative, direct-current pulse in the same manner in which the rectifier 86 operates upon a corresponding signal of $F_1$ that is passed by the filter 82. The resultant negative pulse is applied in parallel to the trigger circuits 97, 98 and 99 and functions therein as in the representative trigger circuit 97.

The negative pulse from the rectifier 89 and applied to the trigger circuit 97 is applied to ground through a resistor 107 therein and is applied through a blocking capacitor 110 directly to the cathode of the tube 99'. The cathode of tube 99' is applied to ground through a choke coil 111. The application of the negative pulse to the cathode of the tube 99' drives it more negative than the grid of the tube 99 and causes the tube 99' to conduct. The flow of current from the plate to the cathode of the tube 99' also makes the grid of the tube 96 less positive by reason of the voltage drop through the resistor 103 and arrests the flow of current through the tube 96. Stopping the current flow through the tube 96 de-energizes the winding of the relay 92 and permits the contact or switch of the relay 92 to open under spring tension in the usual manner. The opening of the contact or switch of the relay 92 interrupts the circuit in the control 93 and arrests the mechanical work being done therein. The self-terminating characteristic of the negative pulse from the rectifier 89 quenches the current flow in the tube 96 and restores it to its quiescent condition preparatory to the reception of the next control signal. The trigger circuit 98 operates a relay 115 and control 116 and the trigger circuit 99 operates the relay 117 and the control 118 in the same manner in which the trigger circuit 97 operates its relay 92 and control 93.

It is to be understood that the circuits, the components in the circuits and the arrangements thereof, that have been disclosed and described herein have been submitted for the purposes of illustrating and describing suitable embodiments of the present invention and that similarly operating modifications, substitutions and rearrangements thereof may be made without departing from the present invention.

What we claim is:

1. A remote control system including: transmitter means for generating a radio carrier; a plurality of modulating oscillators of different frequencies; an equal plurality of multivibrators respectively coupled between said plurality of oscillators and said transmitter means for respectively pulsing the output of each of said oscillators as well as said transmitter means; an equal plurality of means respectively coupled to and triggering said plurality of multivibrators; receiver means for receiving and demodulating the modulated radio carrier pulses sent out by said transmitter means; an equal plurality of filter means, corresponding respectively to said plurality of modulating oscillators, coupled to the output of said receiver means, each of said filter means being respectively pretuned to the corresponding frequency of its respective modulating oscillator; and an equal plurality of energy translating means, each coupled respectively to said plurality of filter means and adapted to be activated by the output therefrom.

2. A remote control system including: transmitter means for generating a radio carrier; a plurality of modulating oscillators of different frequencies; an equal plurality of means coupled between said oscillators and said transmitter means for respectively pulsing the output of each of said oscillators as well as said transmitter means; receiver means for receiving and demodulating the modulated radio carrier pulses sent out by said transmitter means; an equal plurality of filter means, corresponding respectively to said plurality of oscillators, coupled to the output of said receiver means, each of said filter means being respectively pretuned to the corresponding frequency of its respective oscillator; an equal plurality of single kick multivibrator circuits respectively coupled to and adapted to be activated by the outputs from said filter means; and an equal plurality of energy translating means, each coupled respectively to said plurality of multivibrator circuits and adapted to be activated by the output therefrom.

3. A system according to claim 2, further including an additional, different frequency, modulating oscillator; an additional pulsing means coupled between said additional oscillator and said transmitter means for pulsing said transmitter means and said additional oscillator; additional filter means coupled to the output of said receiver means and pretuned to said additional frequency; and a cancelling circuit coupled between the output from said additional filter means and said plurality of multivibrator circuits, whereby said multivibrator circuits may be deactivated and restored to a non-conductive state thereby ceasing to activate said translating means.

4. In a remote control system, a receiver for receiving and demodulating radio carrier pulses sent out by a transmitter; a plurality of filter means coupled to the output of said receiver, each of said filter means being pretuned to a different one of and equal plurality of modulation frequency imposed upon said carrier pulses, for respectively channeling each modulation frequency; an equal plurality of single kick multivibrator circuits respectively coupled to and adapted to be activated by the respective outputs from said plurality of filter means; and an equal plurality of energy translating means respectively coupled to the outputs of said plurality of multivibrator circuits and adapted to be activated thereby.

5. A receiver according to claim 4, further including an additional filter means coupled to the output of said receiver and pretuned to an additional modulation frequency imposed upon said carrier pulses at said transmitter; and a cancelling circuit coupled between the output from said additional filter means and each of said plurality of multivibrator circuits, whereby said multivibrator circuits may be deactivated and restored to a non-conductive state thereby ceasing to activate said translating means.

6. A receiver according to claim 5, wherein said cancelling circuit comprises an impedance load for the output from said additional filter means.

7. In a remote control system, a transmitter including: means for generating a radio carrier wave; at least one source of modulation waves; a multivibrator coupled between said source of modulation waves and said transmitter means for pulsing the output of said source of modulating waves as well as said generating means; and means coupled to and triggering said multivibrator.

8. A transmitter according to claim 7, further including normally inoperative switch means coupled to and adapted to be activated by the output from said multivibrator, the output of said source of modulation waves being coupled to the input of said switch means, the output of said switch means being coupled to the input of said generator means.

THEODORE M. MANLEY.
ROBERT P. CHERPESKI.

References Cited in the file of this patent

UNITED STATES PATENTS

| Number | Name | Date |
|---|---|---|
| 1,608,969 | Webbe | Nov. 30, 1926 |
| 1,818,708 | Hammond, Jr. | Aug. 11, 1931 |
| 2,234,768 | Luck | Mar. 18, 1941 |
| 2,272,070 | Reeves | Feb. 3, 1942 |
| 2,282,102 | Tunick | May 5, 1942 |
| 2,397,088 | Clay | Mar. 26, 1946 |
| 2,235,768 | Luck | Mar. 18, 1941 |
| 2,447,057 | Crosby | Aug. 17, 1948 |
| 2,500,212 | Starr | Mar. 14, 1950 |
| 2,554,329 | Hammond | May 23, 1951 |
| 2,580,453 | Murray et al. | Jan. 1, 1952 |